United States Patent [19]

Frankila

[11] 4,273,301
[45] Jun. 16, 1981

[54] SEAT BELT RETRACTOR WITH EMERGENCY RELEASE AND REDUCED SPOOLING

[75] Inventor: John W. Frankila, Sterling Heights, Mich.

[73] Assignee: Allied Chemical Corporation, Morris Township, Morris County, N.J.

[21] Appl. No.: 137,107

[22] Filed: Apr. 2, 1980

[51] Int. Cl.³ .................... B65H 75/48; A62B 35/02
[52] U.S. Cl. .................... 242/107.2; 242/107.4 A; 280/806
[58] Field of Search ............ 242/107.2, 107.4 R, 242/107.4 E; 280/801–808; 297/474–480

[56] References Cited
U.S. PATENT DOCUMENTS

| | | | |
|---|---|---|---|
| 4,090,735 | 5/1978 | Czernakowski | 242/107.4 A X |
| 4,164,336 | 8/1979 | Higbee et al. | 242/107.4 A |
| 4,211,377 | 7/1980 | Yasumatsu | 242/107.4 A |
| 4,231,591 | 11/1980 | Close | 242/107.4 A |

*Primary Examiner*—John M. Jillions
*Attorney, Agent, or Firm*—Roger H. Criss

[57] ABSTRACT

A seat belt retractor including a locking member, a release member to move the locking member out of its locked position and a web clamp which is engageable with seat belt webbing on the retractor to limit the spooling effect. A handle actuated mechanism actuates the release member to unlock the retractor and renders the clamp ineffective, whereby the retractor is rendered free spooling.

20 Claims, 5 Drawing Figures

SEAT BELT RETRACTOR WITH EMERGENCY RELEASE AND REDUCED SPOOLING

BACKGROUND OF THE INVENTION

1. Field of the Invention

This invention relates to a seat belt retractor including means to disengage the locking function of the retractor.

2. Description of the Prior Art

Seat belt systems are designed to prevent extraction of seat belt webbing from retractors in emergency situations. Typically, a vehicle and/or web sensitive inertia member actuates a pawl to lock against a ratchet surface to abruptly stop rotation of the retractor and prevent further payout of seat belt webbing. It has been recognized that, especially with passive seat belt systems, a need exists to provide an emergency release in the retractor mechanism to permit release of the occupant from the restraint system should, for example, the retractor jam as a result of excessive crash loads or should the vehicle be in an unusual orientation. A device for providing such a release in a retractor is described, for example, in U.S. patent application, Ser. No. 30,193, filed Apr. 16, 1979.

It has also been suggested in U.S. patent application Ser. No. 91,641, filed Nov. 5, 1979, to provide a web clamp and load transfer device to reduce the spooling effect in seat belt retractors, especially, seat belt retractors which are designed for passive seat belt systems. The spooling effect results from extension of webbing from a locked retractor due to tightening up of the windings of the webbing on the retractor spool.

It would be desirable if there were provided a seat belt retractor in which an emergency release were provided together with reduced spooling capabilities.

SUMMARY OF THE INVENTION

In accordance with this invention, there is provided a seat belt retractor comprising:

seat belt storage means;

seat webbing stored on the storage means and adapted to be extracted from and rewound onto the storage means;

locking means operable to lock the retractor against movement in a direction permitting extraction of the webbing from the storage means;

release means actuatable for releasing the locking means; and clamp means effective to limit withdrawal of the webbing from the storage means, the clamp means being ineffective to limit withdrawal of the webbing from the storage means following actuation of the release means.

The present invention thus provides a seat belt retractor wherein a spool release for the locking device and a release for a clamping device are actuated simultaneously. As a result, especially in a passive seat belt restraint system, an occupant can readily unlock the retractor and permit extraction of the webbing from the retractor in order to permit egress from the vehicle, in emergency situations.

DESCRIPTION OF THE PREFERRED EMBODIMENTS

Figure 1:
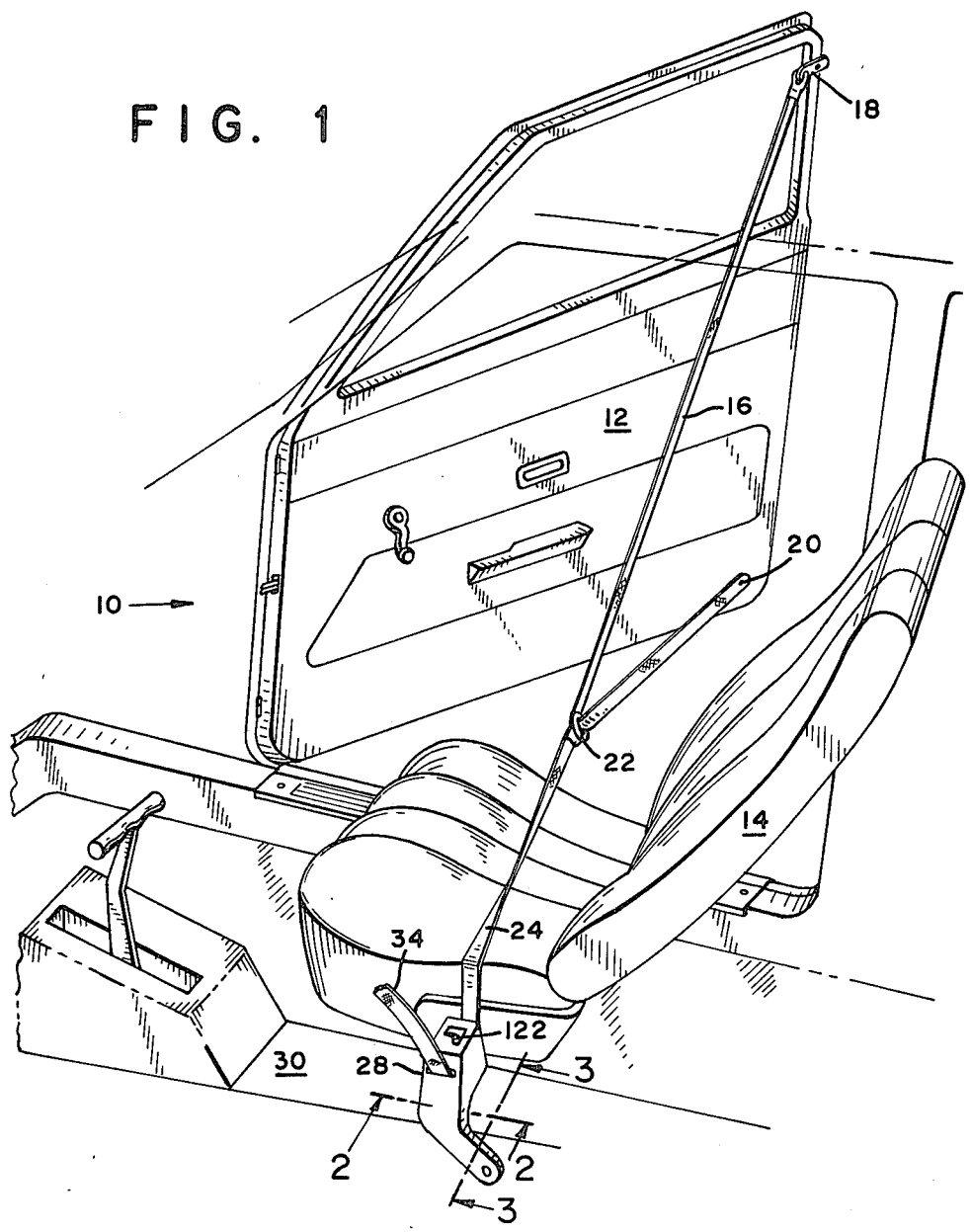
FIG. 1 is a perspective view of a seat belt system for a passenger seat incorporating the retractor of this invention.

With reference to FIG. 1, a seat belt system generally indicated at 10, shown as a passive seat belt system, is provided for a vehicle having a door 12 and a passenger seat 14 adjacent to door 12. A loop of seat belt webbing 16 is mounted on door 12 via upper and lower anchors 18 and 20 to provide shoulder and lap belt portions of the restraint system when door 12 is closed. Loop 16 is slidable through junction ring 22 provided on one-end of connecting seat belt 24, the other end of which is wound on retractor 26 located within housing 28 straddling the console 30 provided over the transmission tunnel of the vehicle. A section of connecting belt 34 for the driver's position is also shown in FIG. 1.

Figure 2:
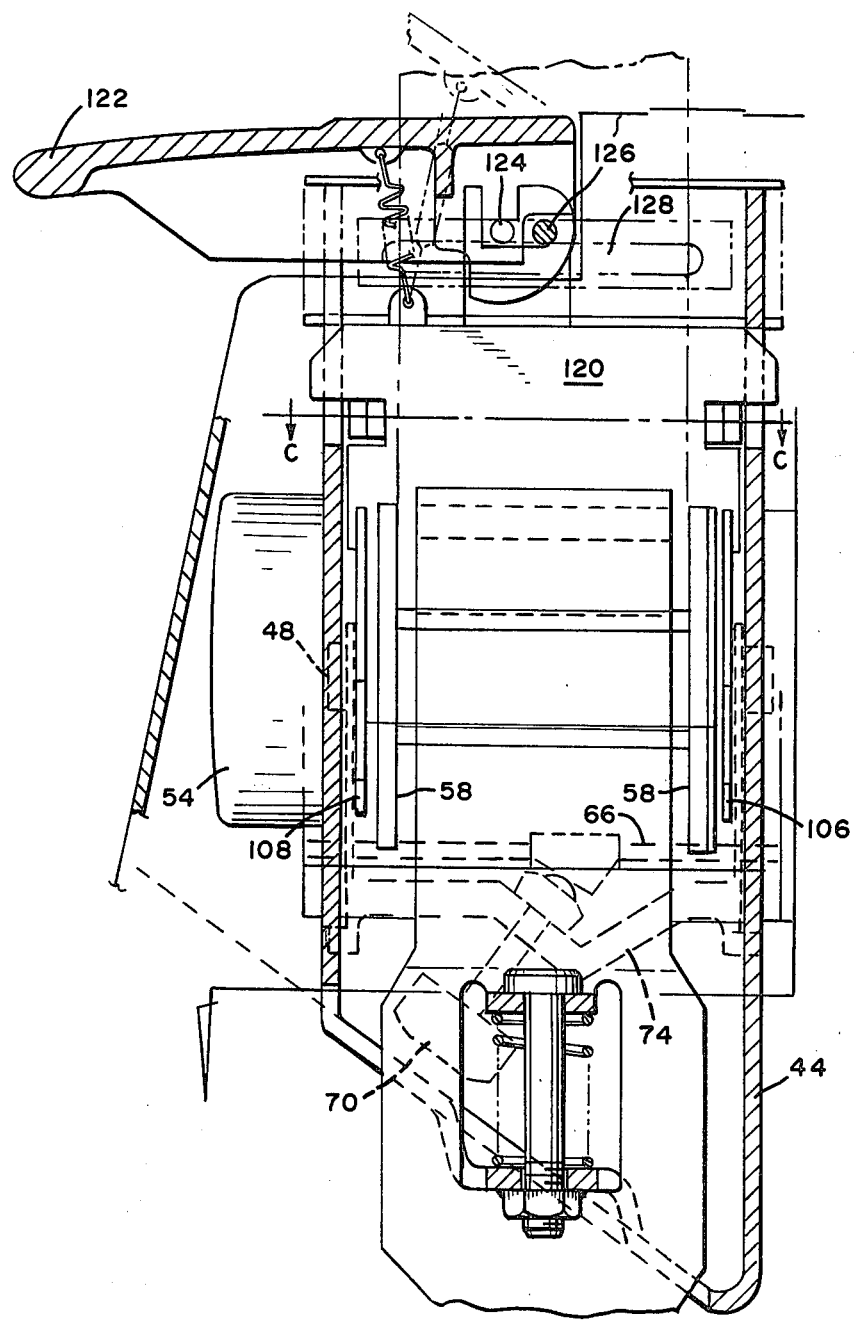
FIG. 2 is a side view of the retractor of FIG. 1 taken along line 2—2.
Figure 3:
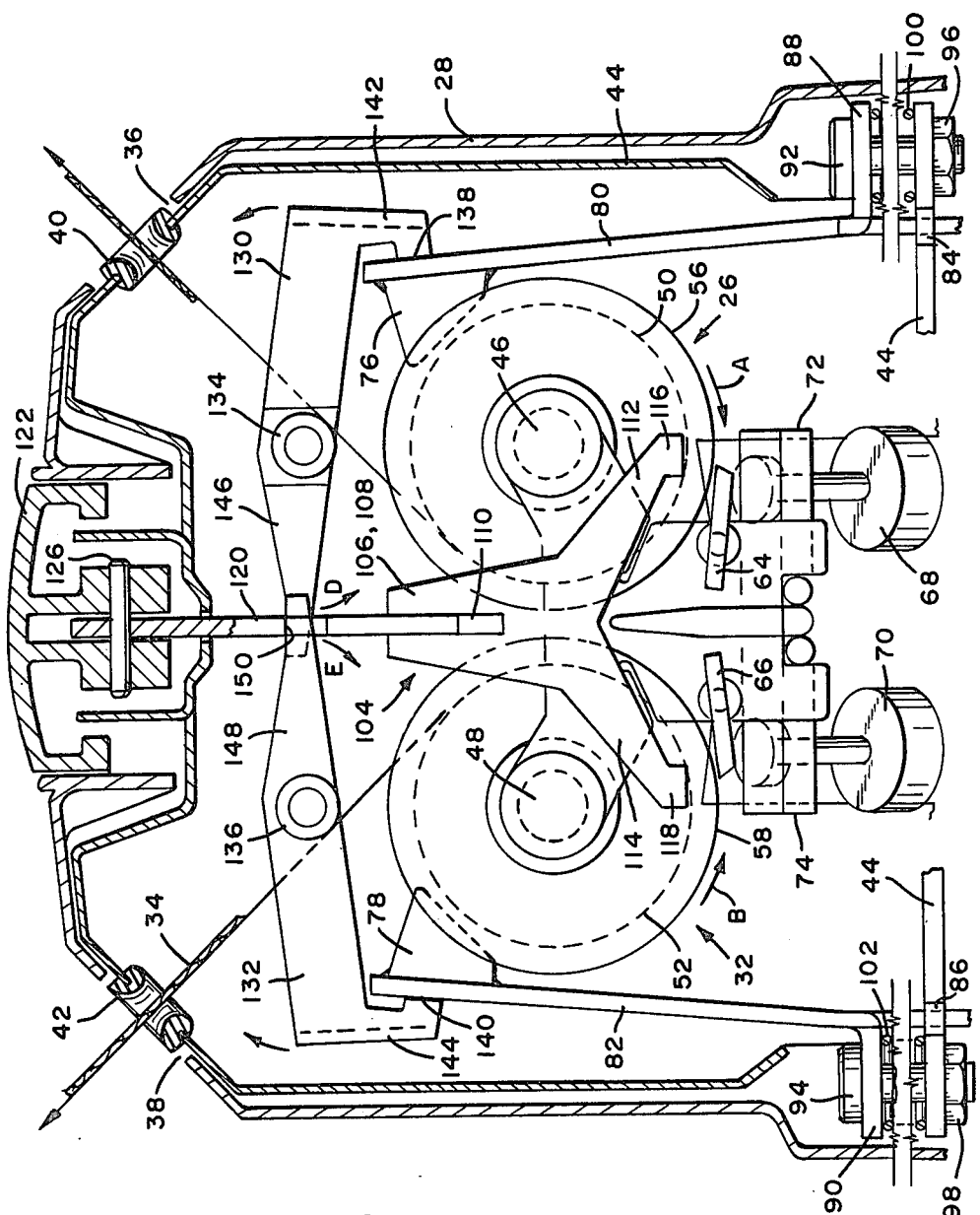
FIG. 3 is an end view of the retractor of FIG. 1 taken along line 3—3.

Referring now to FIGS. 2 and 3, belt 24 extends through slot 36 in housing 28, which may be made of a plastic material, towards retractor 26 and belt 34 extends through slot 38 in housing 28 towards a similar retractor 32 provided for the driver's seat. Guides 40, 42 in U-shaped frame 44 housing retractors 26 and 32 guide belts 24 and 34 through slots 36, 38. Retractors 26, 32 include shafts 46, 48 rotatably mounted in frame 44. Belts 24, 34 are wrapped in the form of rolls of webbing 50, 52 on spools (not shown) surrounding shafts 46, 48. Rewind springs are connected to the shafts to urge the belts onto the retractors in a rewind direction; rewind spring 54 for one retractor is shown in FIG. 2. Affixed to the ends of shafts 46, 48 are two ratchet wheels 56, 58 for each retractor, although if desired a single ratchet wheel for each retractor may be utilized. Ratchet wheels 56, 58 have a plurality of circumferentially spaced peripheral teeth 60, 62 (FIG. 4) which cooperate with pawls 64, 66, pivotably mounted in frame 44 to lock retractors 26, 32 against rotation in the extraction direction (in the direction of the respective arrows A, B in FIG. 3). Pawls 64, 66 are actuated by movement of vehicle sensitive pendulums 68, 70 suspended from saddles 72, 74 attached to shafts 46, 48, as is conventional, to move into contact with the ratchet teeth upon a rapid deceleration of the vehicle to lock the retractors.

FIGS. 2 and 3 show the retractor of this invention in a non-locked position and in a normal attitude.

Wedge-shaped clamps 76, 78 are positioned above rolls 50, 52 of webbing so that a small amount of clearance between the clamps and the full spool of webbing exists. Wedge-shaped clamps 76, 78 are integral with straps 80, 82, which pass through U-shaped frame 44 in clearance slots 84, 86 so that they may be bolted directly to the vehicle structure stradding the tunnel by fastening means (not shown). Tabs 88, 90 extend outwards of straps 80, 82 and terminate outside frame 44. Suspension springs 100, 102 are positioned between tabs 88, 90 and frame 44 by bolts 92, 94 and nuts 96, 98. Springs 100, 102 bias frame 44 in a downwards direction with a relatively low force. As a result, wedges 76, 78 are away from the spooled webbing when normal conditions prevail.

Positioned above pawls 64, 66 is a release member 104 in the form of a yoke having end flanges 106, 108, which are positioned between ratchet wheels 56, 58 and frame 44. End flanges 106, 108 are connected by a central portion 110 and take the general form of inverted Y-shaped members having legs 112, 114 terminating in distal ends 116, 118 which serve to contact pawls 66, 68. Release member 104 is attached to one end of a centrally located strap 120, which in turn is actuatable by a handle 122 located at the opposite end of strap 120 and extending through housing 28. Handle 122 is rotatable about pivot 124 and incorporates pin 126 which engages with slot 128 in strap 120 such that upward actuation of handle 122 (FIG. 2) drives release member 104 and flanges 106, 108 therewith downwards so that ends 116, 118 contact pawls 64, 66 and force the pawls out of engagement with ratchet teeth 60, 62. Backup supports 130, 132 are pivotable about pins 134, 136 journalled in frame 44 and include contact surfaces 138, 140 on downward projecting legs 142, 144. At the opposite end of supports 130, 132 are tapered ends 146, 148, which rest in a slot 150 in strap 120. Downward displacement of strap 120 causes backup supports 130, 132 to rotate away from the ends of straps 80, 82 adjacent wedge clamping devices 76, 78 sufficiently to eliminate any force between them and the spooled webbing.

Figure 4:
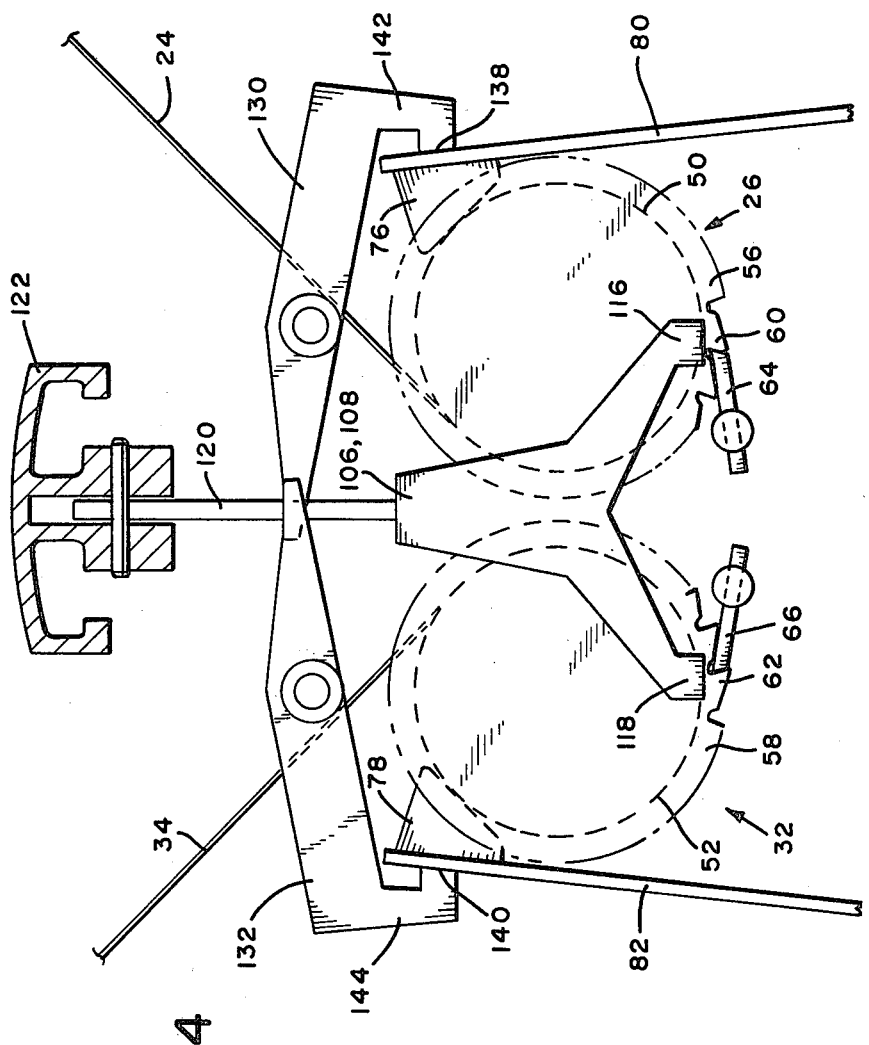
FIG. 4 is a partial end view of the retractor of FIG. 1 in the locked position.

FIG. 4 illustrates the ability of the retractor of this invention to prevent extraction and reduce spooling when the retractor is locked up and loaded. Pawls 64, 66 are shown engaged with teeth 60, 62 of ratchet wheels 56, 58 which would occur upon rapid deceleration of the vehicle. Such positioning effectively disallows rotation of the wheels and, hence, shaft 46, 48. Since frame 44 is effectively fixed to the vehicle via suspension springs 100, 102, subsequent to the occupant having moved against the belts, frame 44 has moved upwards against the spring bias to allow the spooled webbing on rolls 50, 52 to contact clamps 76, 78. As loading on the belts increase, the interacting forces between clamps 76, 78 and the spooled webbing continue to build, which effectively reduces the amount of tightening (slippage) of the webbing on the retractors. It will be noted that such restraining forces are directly transmitted to the vehicle structure through straps 80,82 and outward motion of clamps 76, 78 is prohibited by contact with backup supports 130, 132.

After a crash or similar incident, it is possible for the vehicle to be in an inverted position such that the occupant is suspended onto the seat belt webbing. In order for the vehicle doors to be opened in a passive seat belt system of the type shown in FIG. 1, for example, pawls 64, 66 must be disengaged from teeth 60, 62 and the forces between clamps 76, 78 and the spooled webbing must be eliminated.

Figure 5:
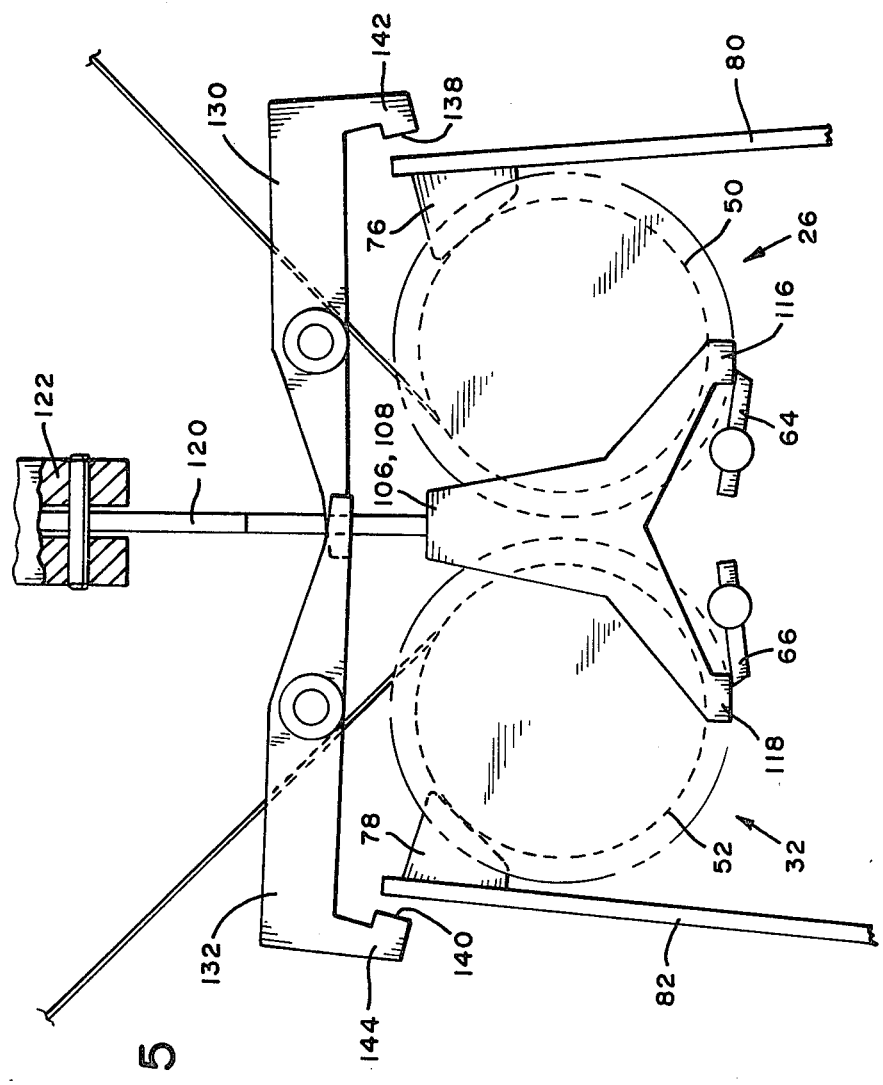
FIG. 5 is a view similar to FIG. 4 but with the release member being actuated.

FIG. 5 illustrates the conditions after release handle 122 has been manually actuated. Strap 120 has moved downwards in a direction of arrow C in FIG. 2 and flanges 106, 108 of release member 104 have moved downwards forcing ends 116, 118 to contact pawls 64, 66 and move them out of engagement with teeth 60, 62. Backup supports 130, 132 have pivoted in the direction of arrows D and E (FIG. 3) so that contact surfaces 138, 140 are no longer in contact with straps 80, 82. This eliminates the forces between clamps 76, 78 and the spooled webbing. Webbing can then be extracted from retractors 26, 32, to allow the vehicle doors to be opened. By returning handle 122 to its original position, the retractors are again in a position to lock up properly if needed.

It should be noted that the use of separate wedge clamps for each spool of webbing results in better equalization of forces acting on the spools. Specifically, if different sized occupants were seated in the vehicle during a crash incident, the diameter of the spooled webbing would be different for each retractor. By having independent wedges, the clamping forces on each spool are directly proportional to the belt loading on such spool.

Although in the foregoing the retractor has been described as a dual spool retractor wherein retractors for different seating positions are housed within a single housing, it is to be understood of course that the present invention likewise may be employed with a single retractor. The retractor(s) may be of the vehicle-sensitive type, as shown, or of the web-sensitive or both vehicle- and web-sensitive types. In addition, it is to be noted that the retractor of this invention may be utilized with active as well as passive seat belt restraint systems.

Furthermore, it may be desirable to move the web clamps into position with the roll of webbing as opposed to moving the roll into contact with the clamps. Likewise, the release means may act on the spools of webbing to move them away from the clamps as opposed to moving the clamps away from the spools. Additionally, the release means may also rotate the ratchet wheels out of their engaged position with the pawls in a manner disclosed, for example, in the aforementioned Serial No. 30,193, in order to render the retractors free spooling.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A seat belt retractor comprising:
    seat belt storage means;
    seat belt webbing stored on said storage means and adapted to be extracted from and rewound onto said storage means;
    locking means operable to lock said retractor against movement in a direction permitting extraction of said webbing from said storage means;
    release means actuatable for releasing said locking means; and
    clamp means effective to limit withdrawal of said webbing from said storage means, and means responsive to actuation of said release means to render said clamp means ineffective to limit withdrawal of said webbing from said storage means following actuation of said release means.

2. The retractor of claim 1 wherein said clamp means is effective to limit withdrawal of said webbing from said storage means following locking of said retractor by said locking means.

3. The retractor of claim 1 wherein said release means comprises means to concurrently release said locking means and render said clamp means ineffective.

4. The retractor of claim 1 including means to maintain said clamp means effective to limit withdrawal of said webbing from said storage means, said maintaining means being movable to a non-maintaining position upon actuation of said release means.

5. The retractor of claim 1 wherein said clamp means is engageable with said webbing to limit withdrawal of said webbing from said storage means.

6. The retractor of claim 5 wherein said clamp means is engageable with said webbing while said webbing is on said storage means.

7. The retractor of claim 6 wherein said webbing is stored in a roll on said storage means and said clamp means is engageable with said roll of webbing.

8. The retractor of claim 1 wherein said locking means comprises pawl and ratchet means.

9. The retractor of claim 8 wherein said release means comprises a surface for contacting said pawl means and moving said pawl means away from said ratchet means whereby said retractor is unlocked.

10. The retractor of claim 9 including deceleration sensor means, said pawl means being moved into contact with said ratchet means upon actuation of said sensor means.

11. The retractor of claim 1 wherein said clamp means comprises a wedge-shaped surface adapted to contact said seat belt webbing.

12. The retractor of claim 1 wherein said storage means is movable with respect to said clamp means whereby said webbing is movable into contact against said clamp means.

13. The retractor of claim 12 icluding biasing means biasing said storage means away from said clamp means.

14. The retractor of claim 1 including load transfer means associated with said clamp means for transferring loads acting on said clamp means.

15. The retractor of claim 1 including manually actuatable means for actuating said release means.

16. The retractor of claim 1 including a plurality of seat belt storage means.

17. The retractor of claim 16 including separate clamp means for each of said seat belt storage means.

18. The retractor of claim 17 including separate locking means for each of said storage means and wherein said release means comprises a single release member for releasing each of said locking means.

19. The retractor of claim 18 including separate means to maintain each of said separate clamp means effective to limit withdrawal of said webbing from storage means, said separate maintaining means being movable to non-maintaining positions upon actuation of said release means.

20. The retractor of claim 19 wherein said release means comprises means to concurrently release each of said locking means and move each of said maintaining means to their non-maintaining position.

* * * * *